(12) United States Patent
Dawson

(10) Patent No.: US 8,144,266 B2
(45) Date of Patent: Mar. 27, 2012

(54) MODULE SYSTEM FOR PERMITTING STORAGE DEVICE INTERFACE WITH TV

(75) Inventor: Thomas Patrick Dawson, Escondido, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 1430 days.

(21) Appl. No.: 11/711,299

(22) Filed: Feb. 27, 2007

(65) Prior Publication Data

US 2008/0204984 A1   Aug. 28, 2008

(51) Int. Cl.
*H04N 5/64* (2006.01)
(52) U.S. Cl. ......................................... 348/836; 348/839
(58) Field of Classification Search .................. 348/834, 348/835, 836, 837, 838, 839, 840, 841, 842, 348/843
See application file for complete search history.

(56) References Cited

U.S. PATENT DOCUMENTS

| | | | |
|---|---|---|---|
| 5,237,610 A * | 8/1993 | Gammie et al. .............. 380/228 |
| 5,262,759 A * | 11/1993 | Moriconi et al. ......... 361/679.29 |
| 5,489,938 A * | 2/1996 | Maruyama et al. ......... 348/14.08 |
| 5,734,442 A * | 3/1998 | Machado ....................... 348/705 |
| 5,787,259 A * | 7/1998 | Haroun et al. ................ 709/253 |
| 6,151,077 A * | 11/2000 | Vogel et al. ................... 348/553 |
| 6,278,486 B1 * | 8/2001 | Hieda et al. .................... 348/239 |
| 6,468,160 B2 * | 10/2002 | Eliott ............................... 463/43 |
| 6,532,004 B1 * | 3/2003 | Harrison et al. .............. 345/169 |
| 6,543,052 B1 * | 4/2003 | Ogasawara ...................... 725/60 |
| 6,550,063 B1 * | 4/2003 | Matsuura ...................... 725/133 |
| 6,821,204 B2 * | 11/2004 | Aonuma et al. ................ 463/32 |
| 6,830,474 B2 * | 12/2004 | Liu et al. ........................ 439/489 |
| 6,878,066 B2 * | 4/2005 | Leifer et al. ..................... 463/39 |
| 6,894,686 B2 * | 5/2005 | Stamper et al. ............... 345/419 |
| 6,929,513 B2 * | 8/2005 | Fan ................................ 439/630 |
| 6,955,606 B2 * | 10/2005 | Taho et al. ....................... 463/43 |
| 6,970,177 B2 * | 11/2005 | Yamada et al. ............... 345/629 |
| 6,971,957 B2 * | 12/2005 | Osako ............................. 463/31 |
| 7,518,624 B2 * | 4/2009 | Ford et al. ...................... 348/383 |
| 7,859,601 B2 * | 12/2010 | Kondo ............................ 348/789 |
| 2001/0011953 A1 * | 8/2001 | Shintani et al. ........... 340/825.22 |
| 2002/0186329 A1 * | 12/2002 | Tong et al. ..................... 348/839 |
| 2003/0080963 A1 * | 5/2003 | Van Hook et al. ............. 345/501 |
| 2004/0006769 A1 * | 1/2004 | Ansari et al. ..................... 725/74 |
| 2004/0014528 A1 * | 1/2004 | Leifer .............................. 463/44 |
| 2004/0117788 A1 * | 6/2004 | Karaoguz et al. ............. 717/177 |

(Continued)

OTHER PUBLICATIONS

Sony Publication, http://web.archive.org/web/20051224002952/ http://www.docs.sony.com/release/VGCV600series.pdf, Dec. 24, 2005, accessed Jul. 20, 2011.*

(Continued)

*Primary Examiner* — William Gilbert
*Assistant Examiner* — James Ference
(74) *Attorney, Agent, or Firm* — John L. Rogitz

(57) ABSTRACT

In a TV system with a modular configuration that permits licensed primary modules such as disk players and personal video recorders to be removably slid into engagement with receptacles in the TV housing, an adapter primary module is provided that is formed with secondary receptacles for receiving secondary modules. The secondary modules have USB ports, Ethernet ports, and memory card slots in a configuration that can be designed by entities other than the TV manufacturer, with the secondary modules having to conform to proprietary licensed interfaces in the adaptor module to ensure a degree of control by the TV manufacturer.

7 Claims, 2 Drawing Sheets

U.S. PATENT DOCUMENTS

| | | | | |
|---|---|---|---|---|
| 2004/0121837 | A1* | 6/2004 | Chiang et al. | 463/24 |
| 2004/0165119 | A1* | 8/2004 | Choi et al. | 348/839 |
| 2005/0245317 | A1* | 11/2005 | Arthur et al. | 463/42 |
| 2006/0015929 | A1 | 1/2006 | Turgeman et al. | 725/153 |
| 2006/0174266 | A1* | 8/2006 | Gatto et al. | 725/37 |
| 2006/0247951 | A1* | 11/2006 | Brown | 705/2 |
| 2006/0288227 | A1* | 12/2006 | Kalofonos et al. | 713/182 |
| 2007/0013515 | A1* | 1/2007 | Johnson et al. | 340/568.1 |
| 2007/0038516 | A1* | 2/2007 | Apple et al. | 705/14 |
| 2007/0217436 | A1* | 9/2007 | Markley et al. | 370/401 |

OTHER PUBLICATIONS

Sony Publication, http://web.archive.org/web/20051224002952/http://www.docs.sony.com/release/VGCV600series.pdf, Dec. 24, 2005, accessed Jul. 19, 2011.*

* cited by examiner

MODULE SYSTEM FOR PERMITTING STORAGE DEVICE INTERFACE WITH TV

FIELD OF THE INVENTION

The present invention relates generally to modules for providing proprietary interfaces to TVs to third party vendors of non-interactive storage media.

BACKGROUND OF THE INVENTION

TV manufacturers may wish to provide TVs with built-in interactive devices, e.g., personal video recorders (PVR), optical disk players such as Blu-Ray disk players and digital video disk (DVD) players and the like, so that a customer conveniently need purchase only the TV with interactive devices in a single seamless system. As recognized by the present assignee, it would be further desirable to provide the interactive devices with the TV in modular form so that as new and upgraded interactive devices become available, the TV system may be upgraded by replacing an old module with a new one without having to purchase an entirely new TV system.

To ensure that only modular interactive devices meeting the manufacturer's standards (to, e.g., protect brand names) can be used in connection with its TVs, a TV manufacturer might wish to develop a proprietary way to connect such modular devices with its TVs such that interactive devices of third party manufacturers cannot be used unless they have been pre-approved by the TV manufacturer and duly licensed. As recognized herein, however, the TV manufacturer might nonetheless wish to provide an easier, less restrictive way for other manufacturers to provide certain non-interactive devices such as data storage devices configured in a wide variety of options so that the TV customer has a wide selection of input/output options from which to choose. It is to this critical recognition that the present invention is directed.

SUMMARY OF THE INVENTION

A TV housing is configured with first and second primary receptacles for respectively slidably receiving first and second primary modules. A first primary module such as a DVD player or PVR is slidably engageable with the first primary receptacle. The first primary module communicates with the first primary receptacle using a primary interface. A second primary module, also referred to herein as an "adaptor" module, is slidably engageable with the second primary receptacle. The second primary module is configured with one or more secondary receptacles. As set forth further below, a secondary module is slidably engageable with the secondary receptacle, with the secondary module including one or more computer network connection ports such as USB ports or Ethernet ports and/or one or more solid state memory element interfaces such as memory card slots. The secondary module may communicate with the secondary receptacle using a secondary interface that is differently configured than the primary interface. With this structure the TV can display a list of content on memory devices communicating with the port and/or memory element interface without requiring individual graphical user interfaces (GUI) for the port and/or memory element interface.

If desired the secondary interface can include an application programming interface (API) allowing an Ethernet connection to the secondary module to be viewed on the TV only as a digital living network association (DLNA) connection such that only DLNA volumes and content associated with the secondary module can be displayed on the TV.

In another aspect, a method for providing a listing on a TV of content on a storage device includes providing a receptacle in the TV and providing a primary module configured for removable positioning within the receptacle. The primary module may include a secondary receptacle. The method includes licensing an entity to provide, for use with the primary module, a secondary module that is positionable in the secondary receptacle. Also, the method includes permitting the entity the discretion to design a configuration of the secondary module including plural secondary receptacles such as solid state memory receptacles and computer network connection ports.

In yet another aspect, a secondary module has a housing configured for positioning within a receptacle of a primary module that in turn is configured for positioning in a receptacle of a TV. Plural secondary receptacles such as solid state memory receptacles and computer network connection ports are on the housing.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
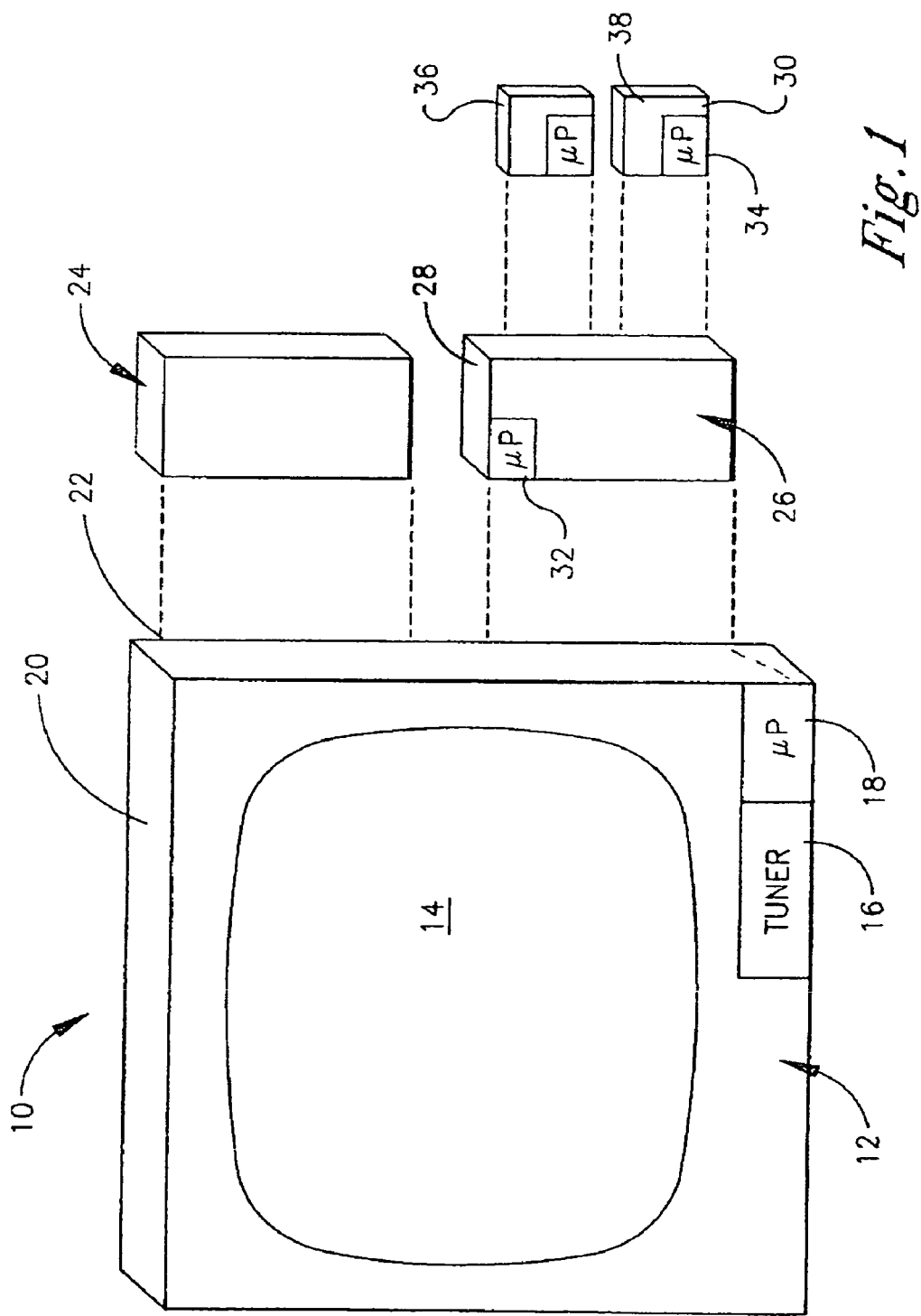
FIG. 1 is a block diagram of a non-limiting implementation of the present system.

Referring initially to FIG. 1, a system is shown, generally designated 10, which includes a TV 12 having a video monitor 14 for displaying TV signals received at a TV tuner 16 under control of a TV processor 18. The TV components are held in a TV housing 20 that can be formed with one or more primary receptacles 22 as shown.

A first primary module 24 is slidably engageable with one of the primary receptacles 22 as shown. As intended by the manufacturer of the TV 12, the first primary module 24 communicates with the corresponding primary receptacle 22 using a proprietary primary interface that can include application programming interfaces (API) and non-standard physical connectors to ensure that only licensed modules 24 can function with the TV 12. The first primary module can be, e.g., an interactive module such as a personal video recorders (PVR) or a video disk player such as a DVD or Blu-Ray player.

The present invention is directed to a second primary module 26 which in essence is an adaptor module that is removably (e.g., slidably) engageable with another primary receptacle 22 of the TV 12 as shown. In accordance with present principles, the adaptor module 26 is configured with one or more secondary receptacles 28. Each secondary receptacle 28 can removably receive (e.g., by sliding) a respective secondary module 30. If desired, a primary module may include a primary processor 32 while a secondary module may include a secondary module processor 34.

In accordance with the present invention, a secondary module 26 is not nor does it include a PVR or a disk player or other interactive device, but rather includes one or more computer network connection ports 36 such as universal serial bus (USB) ports and/or Ethernet ports, as well as solid state memory element interfaces 38 such as slots for receiving solid state memory cards including Memory Sticks™ made by Sony Corp. In the non-limiting embodiment shown in FIG. 1, the top secondary module 30 has four computer network connection ports arranged in a vertical column while the bottom secondary module 30 has two computer network connection ports in a column above a memory card port, it being understood that the particular mix and configuration of the ports/slots of a secondary module are determined in the discretion of a third party provider entity other than the TV manufacturer.

Figure 2:
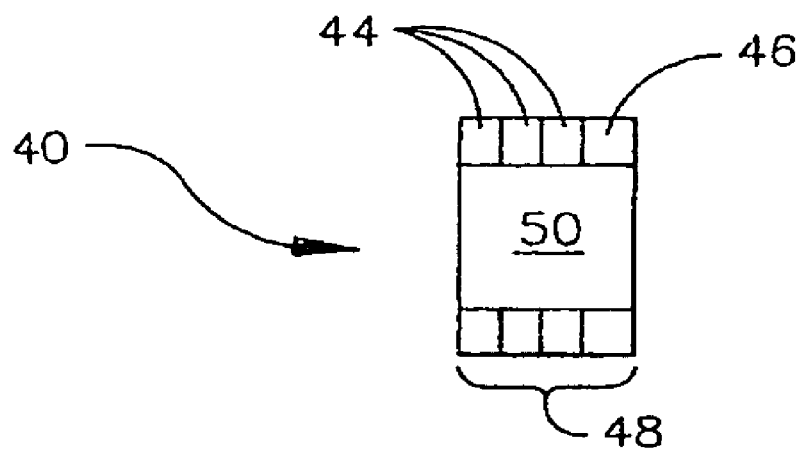
FIG. 2 is an elevational view of an example of a non-standard (proprietary) connector in the adaptor module.
Figure 3:
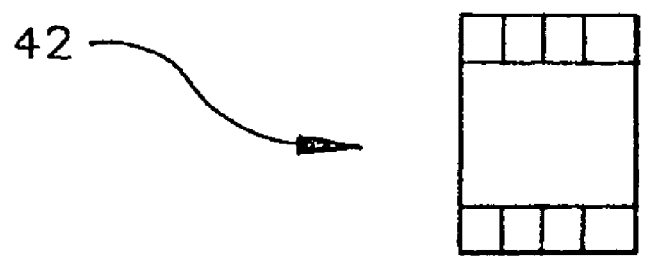
FIG. 3 is an elevational view of an example of a connector on a secondary module that is complementarily-configured to the connector in the receptacle of the adaptor module.

A secondary module 30 communicates with its respective receptacle 28 (and, hence, with the adaptor module 26) using a secondary interface that may be different than and in some embodiments more relaxed than the primary interface, so that the TV 12 can display a list of content on memory devices communicating with the ports 36 and/or memory slots 38 without requiring individual graphical user interfaces (GUI) for the port and/or memory element interface. FIGS. 2 and 3 show that in a non-limiting example the physical part of the interface can include a non-standard connector 40 in the adaptor module 26 and a complementarily-configured connector 42 on the secondary module 30. By non-standard is meant that the connectors 40, 42 are proprietary to the manufacturer of the TV 12 in that standard connectors that can be used with devices of other vendors cannot be used as the connectors 40, 42.

In the non-limiting embodiment shown, each connector 40, 42 may include a top row of connector elements such as pads or pins or sockets with the first three elements 44 in the row being smaller than the last element 46 in the row. A similar bottom row 48 of connector elements can be provided and can be separated from the top row by a spacer section 50.

The interface between the adaptor module 26 and secondary module 30 can also include an application programming interface (API) executable by the processor 32 of the adaptor module 26. In some embodiments the API allows an Ethernet connection to the secondary module 30 to be viewed on the TV 12 only as a digital living network association (DLNA) connection such that only DLNA volumes and content associated with the secondary module can be displayed on the TV. Also, a USB device connected to the TV 12 by means of a USB plug 36 is viewable by the system 10 only as a storage medium. Thus, a computer connected to the USB plug 36 of a secondary module 30 is restricted by the API to functioning only as a storage medium and cannot function for other computing purposes. In any case, no GUI need be provided separately for the adaptor module 26 or secondary module 30, since the TV simply displays a list of content available through the secondary module 30.

With the above disclosure in mind, it may now be appreciated that the present invention permits licensing an entity to provide, for use with the adaptor module 26, a secondary module 30 that is positionable in the receptacle 28 for data storage purposes. The entity providing the module 30 has the discretion to design a configuration of the secondary module including the configuration of memory card slots and computer network connection ports.

While the particular MODULE SYSTEM FOR PERMITTING STORAGE DEVICE INTERFACE WITH TV is herein shown and described in detail, it is to be understood that the subject matter which is encompassed by the present invention is limited only by the claims.

What is claimed is:

1. A system, comprising:
   a TV housing holding a TV and configured with at least first and second primary receptacles for respectively slidably receiving first and second primary modules therein;
   at least a first primary module slidably engageable with the first primary receptacle, the first primary module being selected from the group consisting of personal video recorders (PVR) and video disk players;
   at least a second primary module slidably engageable with the second primary receptacle, the second primary module being configured with at least one secondary receptacle; and
   at least a secondary module slidably engageable with the secondary receptacle, the secondary module including the secondary receptacle, the secondary module including at least one computer network connection port and at least one solid state memory element interface, or the secondary module including at least one computer network port, or the secondary module including at least one solid state memory element interface, the secondary module communicating with the secondary receptacle using a secondary interface, whereby the TV displays a list of content on memory devices communicating with the port and/or memory element interface without requiring individual graphical user interfaces (GUI) for the port and/or memory element interface.

2. The system of claim 1, wherein the secondary interface includes at least one receptacle connector in the secondary receptacle having a configuration that is different from a USB configuration.

3. The system of claim 1, wherein the secondary interface includes at least one connector in the secondary module complementarily configured to the receptacle connector.

4. The system of claim 1, wherein the secondary interface includes an application programming interface (API) allowing an Ethernet connection to the secondary module to be viewed on the TV only as a digital living network association (DLNA) connection such that only DLNA volumes and content associated with the secondary module can be displayed on the TV.

5. The system of claim 1, wherein the memory element is a memory card.

6. The system of claim 1, wherein the port is a universal serial bus (USB) port.

7. The system of claim 1, wherein the port is an Ethernet port.

* * * * *